United States Patent
Hu et al.

(10) Patent No.: US 9,130,709 B2
(45) Date of Patent: Sep. 8, 2015

(54) METHOD FOR INTER-CELL DOWNLINK INTERFERENCE MINIMIZATION VIA COMP

(75) Inventors: Kathy Hu, Beijing (CN); Judy Wei, Beijing (CN); Mary Liang, Beijing (CN)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 428 days.

(21) Appl. No.: 13/612,047

(22) Filed: Sep. 12, 2012

(65) Prior Publication Data

US 2014/0071841 A1 Mar. 13, 2014

(51) Int. Cl.
- *H04W 4/00* (2009.01)
- *H04L 5/00* (2006.01)
- *H04B 7/02* (2006.01)
- *H04J 11/00* (2006.01)

(52) U.S. Cl.
CPC .............. *H04L 5/0035* (2013.01); *H04B 7/024* (2013.01); *H04J 11/0053* (2013.01); *H04L 5/0073* (2013.01)

(58) Field of Classification Search
USPC .......................... 370/252, 329, 330, 338, 333
See application file for complete search history.

(56) References Cited

U.S. PATENT DOCUMENTS

| | | | |
|---|---|---|---|
| 2010/0056170 A1* | 3/2010 | Lindoff et al. | 455/452.1 |
| 2011/0053633 A1 | 3/2011 | Han et al. | |
| 2011/0310786 A1* | 12/2011 | Qin et al. | 370/312 |
| 2012/0027108 A1 | 2/2012 | Hong et al. | |
| 2012/0087273 A1* | 4/2012 | Koo et al. | 370/252 |
| 2012/0172076 A1* | 7/2012 | Seki | 455/509 |
| 2012/0178462 A1 | 7/2012 | Kim | |

OTHER PUBLICATIONS

3GPP TR 36.814, "$3^{rd}$ Generation Partnership Project; Technical Specification Group Radio Access Network; Evolved Universal Terrestrial Radio Access (E-UTRA); Further Advancements for E-UTRA Physical Layer Aspects (Release 9)," V9.0.0, Mar. 2010.

* cited by examiner

*Primary Examiner* — Zewdu A Beyen

(57) ABSTRACT

A cell edge user central based CoMP CS JP mode selection scheme to minimize inter-cell downlink interference. According to the distribution of different types of users adaptive select optimal transmission scheme. After guaranteeing the performance of cell edge user at first, mode selection should be applied to select suitable paired users in order to increase the cell average throughput. Through carefully designing the SINR gaps and level of interference for mode selection, mode selection is a significant solution for the tradeoff between cell edge user throughput and cell average throughput and the tradeoff between performance and complexity.

20 Claims, 8 Drawing Sheets

METHOD FOR INTER-CELL DOWNLINK INTERFERENCE MINIMIZATION VIA COMP

TECHNICAL FIELD

The technology relates to radio signal transmission systems. More specifically, the technology relates to coordinated downlink (DL) performance enhancement. Non-limiting example applications of the technology include telecommunication systems, such as those implementing standards like global system for mobile communications (GSM), wideband code division multiple access (WCDMA), long term evolution (LTE), or any other standard or combinations thereof.

BACKGROUND

In a typical cellular radio system, wireless terminals (also known as mobile stations and/or user equipment units (UEs)) communicate via a radio access network (RAN) to one or more core networks. The radio access network (RAN) covers a geographical area which is divided into cell areas, with each cell area being served by a base station, e.g., a radio base station (RBS), which in some networks may also be called, for example, a "NodeB" (UMTS) or "eNodeB" (LTE). A cell is a geographical area where radio coverage is provided by the radio base station equipment at a base station site. Each cell is identified by an identity within the local radio area, which is broadcast in the cell. The base stations communicate over the air interface operating on radio frequencies with the user equipment units (UE) within range of the base stations.

In some versions of the radio access network, several base stations are typically connected (e.g., by landlines or microwave) to a controller node (such as a radio network controller (RNC) or a base station controller (BSC)) which supervises and coordinates various activities of the plural base stations connected thereto. The radio network controllers are typically connected to one or more core networks.

The Universal Mobile Telecommunications System (UMTS) is a third generation mobile communication system, which evolved from the second generation (2G) Global System for Mobile Communications (GSM). UTRAN is essentially a radio access network using wideband code division multiple access for user equipment units (UEs). In a forum known as the Third Generation Partnership Project (3GPP), telecommunications suppliers propose and agree upon standards for third generation networks and UTRAN specifically, and investigate enhanced data rate and radio capacity. Specifications for the Evolved Universal Terrestrial Radio Access Network (E-UTRAN) are ongoing within the $3^{rd}$ Generation Partnership Project (3GPP). The Evolved Universal Terrestrial Radio Access Network (E-UTRAN) comprises the Long Term Evolution (LTE) and System Architecture Evolution (SAE). Long Term Evolution (LTE) is a variant of a 3GPP radio access technology wherein the radio base station nodes are connected to a core network (via Access Gateways, or AGWs) rather than to radio network controller (RNC) nodes. In general, in LTE the functions of a radio network controller (RNC) node are distributed between the radio base stations nodes (eNodeB's in LTE) and AGWs. As such, the radio access network (RAN) of an LTE system has an essentially "flat" architecture comprising radio base station nodes without reporting to radio network controller (RNC) nodes.

Network multiple-input and multiple-output (MIMO) and collaborative MIMO have been proposed for LTE. Factors to consider for MIMO include: geographical separation of antennas, selected coordinated multi-point processing approach (e.g., coherent or non-coherent), and coordinated zone definition (e.g., cell-centric or user-centric). Depending on whether the same data to a UE is shared at different cell sites, collaborative MIMO includes single-cell antenna processing with multi-cell coordination, or multi-cell antenna processing.

In the 3rd Generation Partnership Project (3GPP), coordinated multi-point transmission/reception (CoMP) is considered a tool to improve coverage, cell-edge throughput, and/or system efficiency. In coordinated multi-point transmission/reception (CoMP), transmission to a user is collaborated by multiple base stations or network points, acting together to remove interference. In some respects, CoMP focuses on user equipment (UE) located in a cell-edge region. In the cell-edge region, the UE may be able to receive signals from multiple cell sites and its transmissions may be received at multiple cell sites, regardless of the system load. However, if the radio signal transmissions are from multiple cell sites are coordinated, the downlink (DL) performance can be increased significantly. This coordination can vary in complexity from techniques that focus on interference avoidance to those which are more complex, e.g., where the same data is transmitted from multiple cell sites.

In terms of downlink CoMP, two different approaches are under consideration. A first approach is coordinated scheduling CS, which includes coordinated beamforming (CB). A second approach is joint processing JP, which includes joint transmission (JT). Beamforming is a signal processing technology that is used to direct the reception or transmission (the signal energy) on an antenna array in a chosen angular direction. Beamforming concentrates the array to energy coming from only one particular direction to apprehend signals in one direction and ignore signals in other directions.

Thus, including Single Point Transmission, there are in general modes of data transmission: the Single Point Transmission Mode (SP); the CoMP CS Mode; and the CoMP JP Mode. The single point transmission mode (SP) is a traditional transmission mode without CoMP. In general, CoMP CS is a transmission mode in which there is only a single user served by the coordinated nodes (e.g., eNBs), and which benefits essentially only the cell edge users. CoMP JP is a transmission mode in which there are multiple users served by the coordinated nodes (e.g., eNBs). Unlike CoMP CS, CoMP JP may benefit both cell edge users as well as cell central users.

In the coordinated scheduling CS approach, the transmission to a single UE is transmitted from a serving cell, exactly as in the case of non-CoMP transmission. However, the scheduling of transmission on the downlink from the serving cell to the UE, including any beamforming functionality, is dynamically coordinated between the cells (e.g., scheduled to take into consideration the transmissions from other cells) in order to control and/or reduce the interference between different transmissions. In principle, the best served set of users will be selected so that the transmitter beams are constructed to reduce the interference to other neighboring users, while increasing the served user's signal strength.

In the joint processing JP approach, the transmission to a single UE is simultaneously transmitted from multiple transmission points, across cell sites. The multi-point transmissions are coordinated as a single transmitter with antennas that are geographically separated. The joint processing JP scheme has the potential for higher performance, compared to coordination only in the scheduling. However, joint processing JP typically has more stringent requirements for the backhaul communications (e.g., more stringent requirements for intermediate links between the core network, or backbone, of the network and the small sub-networks at the "edge" of the entire hierarchical network communications).

While CoMP JP may benefit more users, from a single user's point of view, CoMP JP has a weaker performance than CoMP CS because of co-channel interference, especially when the channel matrices of the active users are not orthogonal enough, or the precoding matrix indices (PMIs) of the active users are not orthogonal enough. In the CoMP JP mode, as there are so many users who should be jointly processed by multiple coordinated eNBs including cell edge and cell central users, it is very complex to perform joint signal processing and associated scheduling. Moreover, CoMP JP mode needs a very high speed low delay backhaul link.

As discussed above, there are drawbacks applying CoMP CS or CoMP JP separately. What is needed is a method which benefits from aspects of both approaches.

SUMMARY

In one of its aspects the technology disclosed herein concerns a method of operating a radio communications network. The radio communications network including a plurality of radio communication cells and at least one wireless terminal served by one or more of the plurality of radio communication cells. In an example basic embodiment and mode the method comprises: determining inter-cell downlink interference to the at least one wireless terminal; selecting, based on the inter-cell downlink interference, a selected downlink transmission mode from a set of modes comprising a single-point transmission mode and multiple multi-point transmission modes; and, using the selected transmission mode to coordinate downlink radio communications with the at least one wireless terminal.

In an example embodiment and mode at least one the multi-point transmission modes comprises coordinated multi-point transmission (CoMP). For example, the multiple multi-point transmission modes may include any of: a coordinated scheduling/coordinated beam-forming (CoMP CS/CB) transmission mode and a coordinated joint processing/joint transmission (CoMP JP/JT) transmission mode.

In an example embodiment and mode the act of determining the inter-cell interference comprises performing at least one radio signal measurement. In an example implementation, the at least one radio signal measurement includes signal to interference plus noise ratio (SINR).

In an example embodiment and mode the method further comprises determining a region location of the at least one wireless terminal relative to a center of a cell which serves the wireless terminal. In an example implementation, the method further comprises selecting the single point transmission mode for a wireless terminal located in the center region of the cell and having channel quality in a high channel quality range (H); and, selecting one of the multi-point transmission modes based on a low channel quality for a wireless terminal located in an edge region of the cell and having channel quality below the high channel quality range (H). In an example implementation, the method further comprises selecting a coordinated scheduling/coordinated beam-forming (CoMP CS/CB) transmission mode based on a low channel quality for a wireless terminal located in the edge region of a radio communication cell and having channel quality in a low channel quality range (L1), wherein L1<H; and selecting a joint processing/joint (CoMP JP/JT) transmission mode for a wireless terminal located in an edge region of the cell and having channel quality in a lowest channel quality range (L2), wherein L2<L1.

In another of its aspects the technology disclosed herein concerns another method of operating a radio communications network. The radio communications network comprises a plurality of radio communication cells and at least one wireless terminal served by one or more of the plurality of radio communication cells. The method comprises determining channel quality for the at least one wireless terminal; determining whether the at least one wireless terminal is located in a center or edge region of the radio communication cell in which it resides; selecting a single-point (SP) transmission mode as a selected mode for downlink radio communications to the wireless terminal if the high channel quality is high and the wireless terminal is determined to occupy a center region location; selecting a coordinated multi-point transmission mode (CoMP) as the selected mode for downlink radio communications to the wireless terminal if the channel quality is low and the wireless terminal is determined to occupy an edge region location; and, using the selected transmission mode to downlink radio communications to the wireless terminal.

In an example embodiment and mode the method comprises selecting between plural types of CoMP transmission modes based on a relative channel quality at the edge region of the cell.

In an example implementation the plural types of CoMP transmission modes comprise a coordinated scheduling/coordinated beam-forming (CS/CB) transmission mode and a multi-point CoMP Joint Processing (JP) transmission mode, and the method further comprises selecting the coordinated scheduling/coordinated beam-forming (CoMP CS/CB) transmission mode based on a low channel quality for when the wireless terminal is located in the edge region of a radio communication cell and has channel quality in a low channel quality range (L1); and, selecting the joint processing/joint (CoMP JP/JT) transmission mode when the wireless terminal is located in an edge region of the cell and has channel quality in a lowest channel quality range (L2), wherein L2<L1.

In another of its aspects the technology disclosed herein concerns a radio communications network comprising a node and at least one wireless terminal. The radio communications network comprises a plurality of radio communication cells. The at least one wireless terminal is served by one or more of the plurality of radio communication cells. The wireless terminal comprises, e.g., a channel quality reporter configured to provide an indication of inter-cell downlink interference for the at least one wireless terminal to a node. The node comprises processing circuitry configured to select, based on inter-cell downlink interference to at least one wireless terminal of the network, a selected downlink transmission mode from a set of modes comprising a single-point transmission mode and multiple multi-point transmission modes.

In an example embodiment and mode, the circuitry of the node is further configured to use the selected transmission mode to coordinate downlink radio communications with the at least one wireless terminal.

In an example embodiment, at least one the multi-point transmission modes comprises coordinated multi-point transmission (CoMP), and the multiple multi-point transmission modes include any of: a coordinated scheduling/coordinated beam-forming (CoMP CS/CB) transmission mode and a coordinated joint processing/joint transmission (CoMP JP/JT) transmission mode.

In another of its aspects the technology disclosed herein concerns a node of a radio communications network. The node comprises electronic circuitry configured to select, based on inter-cell downlink interference to at least one wireless terminal of the network, a selected downlink transmission mode from a set of modes comprising a single-point transmission mode and multiple multi-point transmission modes.

In an example embodiment, the electronic circuitry is further configured to use the selected transmission mode to coordinate downlink radio communications with the at least one wireless terminal.

In an example embodiment, at least one the multi-point transmission modes comprises coordinated multi-point transmission (CoMP) and the multiple multi-point transmission modes include any of: a coordinated scheduling/coordinated beam-forming (CoMP CS/CB) transmission mode and a coordinated joint processing/joint transmission (CoMP JP/JT) transmission mode.

In an example embodiment, the inter-cell interference is expressed as at least one radio signal measurement. In an example implementation, the at least one radio signal measurement is expressed as a signal to interference plus noise ratio (SINR).

In an example embodiment, the electronic circuitry is further configured to determine a region location of the at least one wireless terminal relative to a center of a cell which serves the wireless terminal. In an example implementation, the electronic circuitry is further configured to select the single point transmission mode for a wireless terminal located in the center region of the cell and having channel quality in a high channel quality range (H); to select one of the multi-point transmission modes based on a low channel quality for a wireless terminal located in an edge region of the cell and having channel quality below the high channel quality range (H), and in particular to select a coordinated scheduling/coordinated beam-forming (CoMP CS/CB) transmission mode based on a low channel quality for a wireless terminal located in the edge region of a radio communication cell and having channel quality in a low channel quality range (L1), wherein L1<H; and to select a joint processing/joint (CoMP JP/JT) transmission mode for a wireless terminal located in an edge region of the cell and having channel quality in a lowest channel quality range (L2), wherein L2<L1.

BRIEF DESCRIPTION OF THE DRAWINGS

The foregoing and other objects, features, and advantages of the technology disclosed herein will be apparent from the following more particular description of preferred embodiments as illustrated in the accompanying drawings in which reference characters refer to the same parts throughout the various views. The drawings are not necessarily to scale, emphasis instead being placed upon illustrating the principles of the technology disclosed herein.

DETAILED DESCRIPTION

Figure 1:
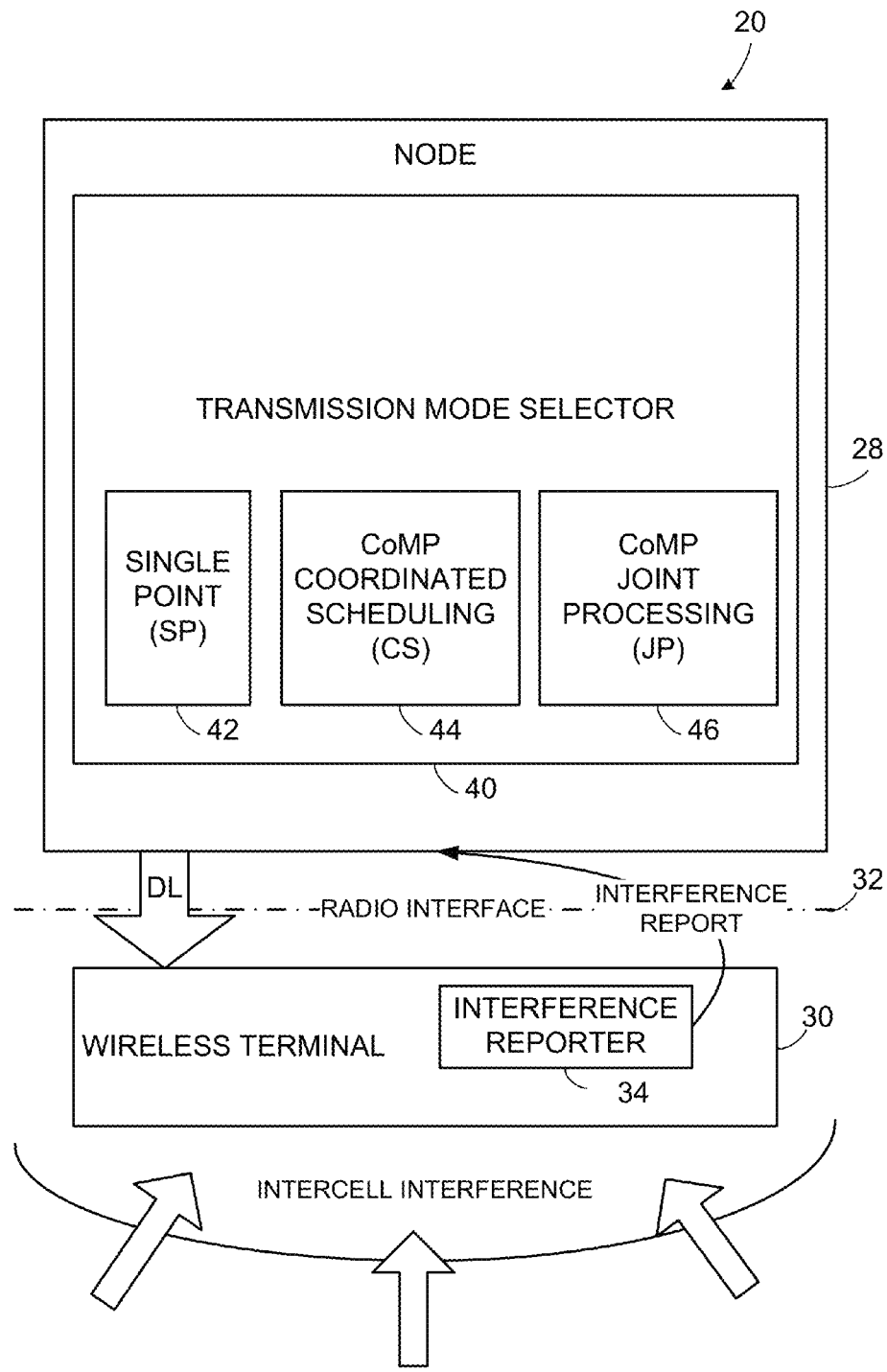
FIG. 1 is a diagrammatic view of an example embodiment of a radio communications network comprising a node which facilitates selection among plural CoMP transmission modes for downlink communications.

In the following description, for purposes of explanation and not limitation, specific details are set forth such as particular architectures, interfaces, techniques, etc. in order to provide a thorough understanding of the technology disclosed herein. However, it will be apparent to those skilled in the art that the technology disclosed herein may be practiced in other embodiments that depart from these specific details. That is, those skilled in the art will be able to devise various arrangements which, although not explicitly described or shown herein, embody the principles of the technology disclosed herein and are included within its spirit and scope. In some instances, detailed descriptions of well-known devices, circuits, and methods are omitted so as not to obscure the description of the technology disclosed herein with unnecessary detail. All statements herein reciting principles, aspects, and embodiments of the technology disclosed herein, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry or other functional units embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and/or field programmable gate array(s) (FPGA(s)), and (where appropriate) state machines capable of performing such functions.

In terms of computer implementation, a computer is generally understood to comprise one or more processors or one or more controllers, and the terms computer and processor and controller may be employed interchangeably herein.

When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

The following terminologies may be used in the disclosure for consistency and simplicity. The technology described herein may apply to a heterogeneous network comprising network As used herein, the term "node" may encompass nodes using any technology including, e.g., high speed packet access (HSPA), long term evolution (LTE), code division multiple access (CDMA) 2000, GSM, etc. or a mixture of technologies such as with a multi-standard radio (MSR) node (e.g., LTE/HSPA, GSM/HS/LTE, CDMA2000/LTE etc). Furthermore the technology described herein may apply to different types of nodes e.g., base station, eNode B, Node B, relay, base transceiver station (BTS), donor node serving a relay node (e.g., donor base station, donor Node B, donor eNB), supporting one or more radio access technologies.

Nodes that communicate using the air interface also have suitable radio communications circuitry. Moreover, the technology can additionally be considered to be embodied entirely within any form of computer-readable memory, such as solid-state memory, magnetic disk, or optical disk containing an appropriate set of computer instructions that would cause a processor to carry out the techniques described herein.

FIG. 1 shows an example radio communications network 20 comprising a node 28 and at least one wireless terminal 30. As further shown and understood with reference to FIG. 5, subsequently described, the radio communications network 20 comprises a plurality of radio communication cells and wireless terminal 30 is served by one or more of the plurality of radio communication cells.

The node 28 of the technology disclosed herein facilitates selection among plural transmission modes for downlink communications to wireless terminal 30. As such, node 28 can be any type of node, including a node of a radio access network such as a base station node (BS or eNodeB) of a Long Term Evolution (LTE) radio access network or other type of network, and thus may serve at least one of the plurality of radio communication cells which comprise radio communications network 20. Alternatively, the node 28 may be a radio network controller node, and as such may control (e.g., resources and scheduling) for one or more the radio communication cells which comprise radio communications network 20. Yet further, node 28 may be a server or other entity which may be included in or be connected to a radio access network of the radio communications network 20. Since in its various embodiments the node 28 may (as a base station node [BS or eNodeB]) serve a radio communication cell in which wireless terminal 30 participates in radio communications, or (as radio network controller) control a cell in which wireless terminal 30 participates in radio communications, the wireless terminal 30 is shown as communicating with node 28 across an air or radio interface 32 (depicted by dot-dashed lines in FIG. 1).

As shown in FIG. 1, wireless terminal comprises interference reporter 34.

Figure 5:
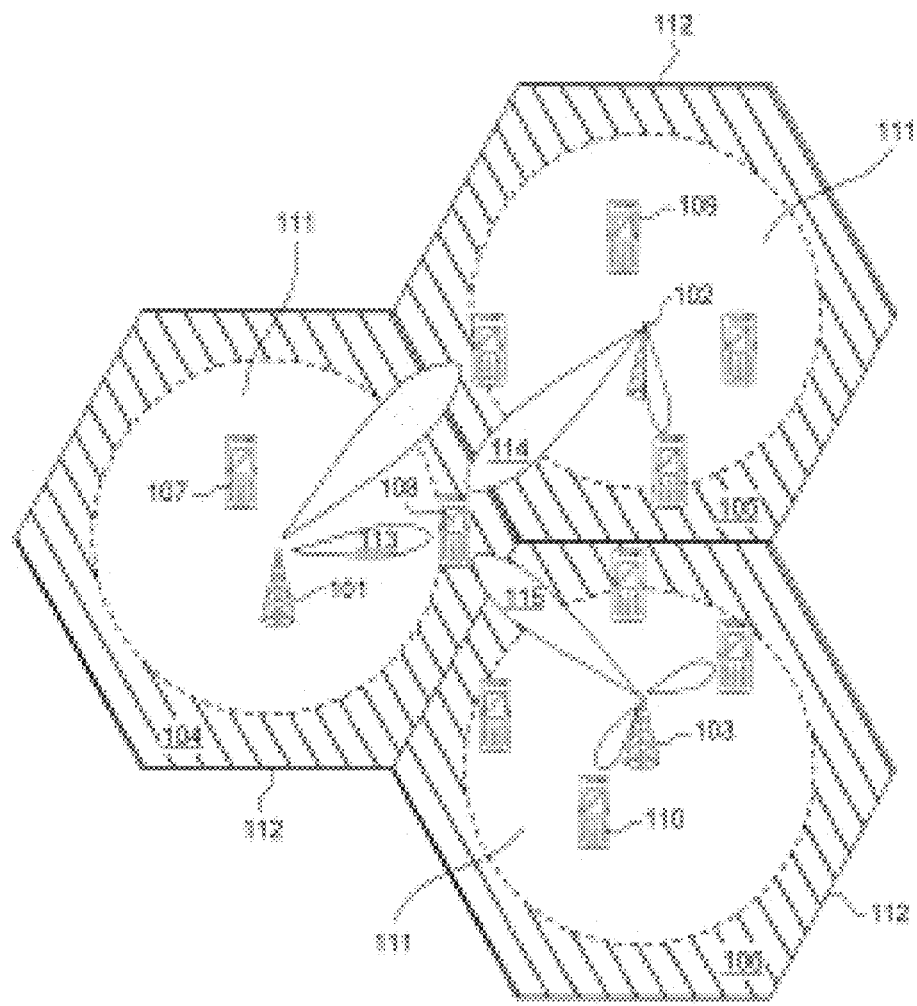
FIG. 5 is a diagrammatic view of an example radio communications network illustrating inter-cell interference for wireless terminals.

Since, as illustrated in FIG. 5 and as understood in the art, wireless terminal 30 may be receiving transmissions from plural cells, interference reporter 34 is configured to provide an indication to node 28 of inter-cell downlink interference experienced by wireless terminal 30. The indication of inter-cell downlink interference experienced by wireless terminal 30 may be expressed in various ways, such as channel quality, for example.

The person skilled in the art appreciates that wireless terminal 30 comprises other unillustrated functionalities and constituent units, such as (for example) one or more communication interfaces and electronic circuitry suitable for executing various applications and, in accordance therewith and one or more other programs, scheduling and effecting transmission and reception of user traffic data and signaling data in the form of wireless communications over radio interface 32.

As mentioned above, the node 28 facilitates selection among plural transmission modes for downlink communications to wireless terminal 30. To this end node 28 comprises transmission mode selector 40, among the other unillustrated functionalities and constituent units of node 28. The transmission mode selector 40 is configured to select, based on inter-cell downlink interference (as reported by the interference reporter 34 of wireless terminal 30), a selected downlink transmission mode from a set of possible transmission modes. The set of possible transmission modes from which transmission mode selector 40 performs its selection comprises a single-point transmission mode and multiple multi-point transmission modes. In the particular embodiment shown in FIG. 1, transmission mode selector 40 is illustrated as selecting between single-point transmission mode 42 and two multi-point transmission modes which are coordinated multi-point transmission modes (CoMP), e.g., coordinated scheduling/coordinated beam-forming (CoMP CS/CB) transmission mode 44 and coordinated joint processing/joint transmission (CoMP JP/JT) transmission mode 46.

Figure 2:
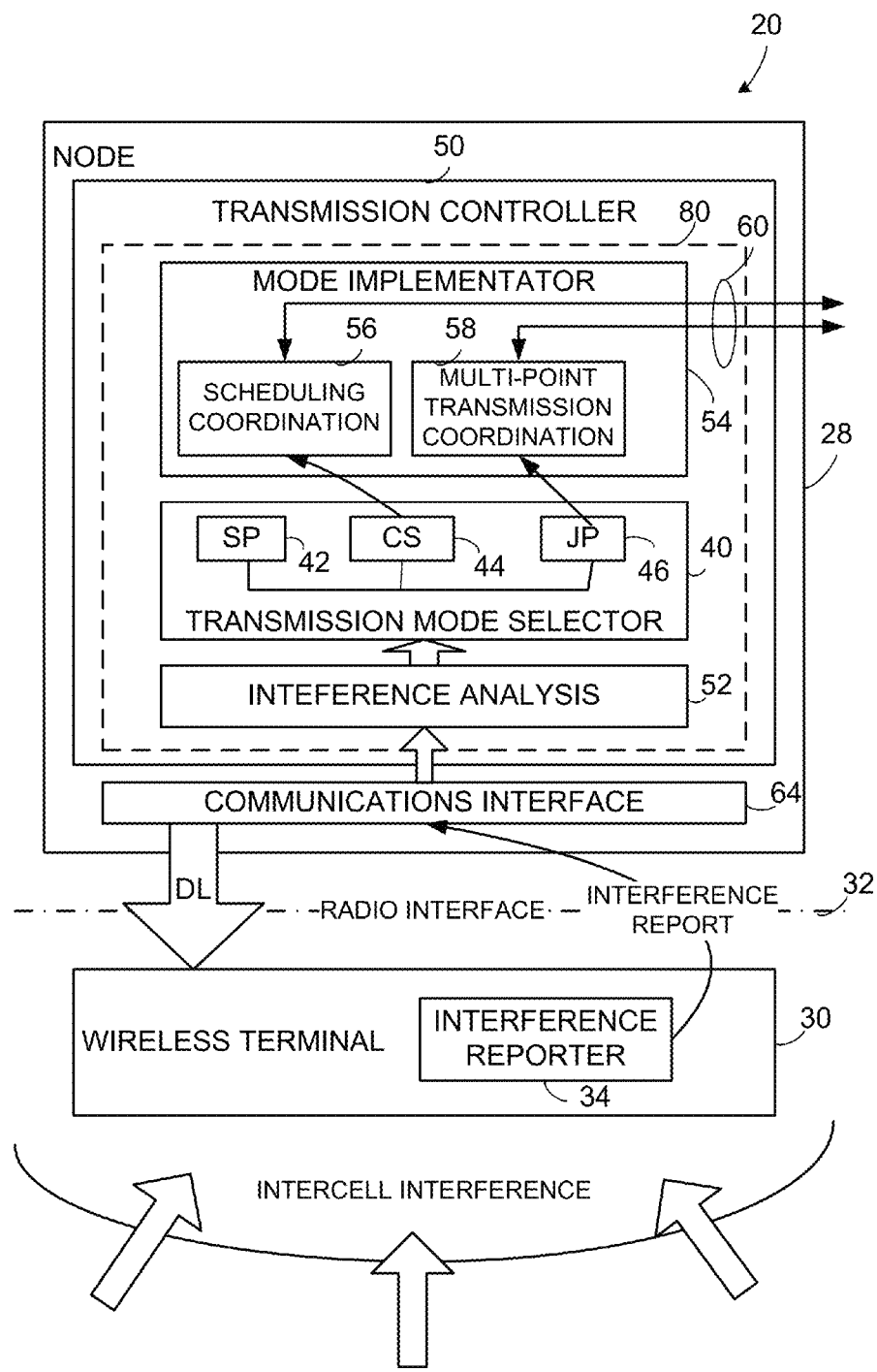
FIG. 2 is a diagrammatic view of an example embodiment of a node in more detail and in the context of a radio communications network.

FIG. 2 shows an example embodiment of node 28 in more detail and in the context of radio communications network 20. As shown in FIG. 2, the transmission mode selector 40 comprises, e.g., is included in or as a part of, transmission controller 50. In addition to transmission mode selector 40, transmission controller 50 comprises interference analysis unit 52 and mode implementation unit 54. The interference analysis unit 52 receives the inter-cell downlink interference report from wireless terminal 30 and presents the inter-cell downlink interference information in a form usable to transmission mode selector 40. As understood from the foregoing, using the inter-cell downlink interference information the transmission mode selector 40 selects between single-point transmission mode 42, coordinated scheduling/coordinated beam-forming (CoMP CS/CB) transmission mode 44, and coordinated joint processing/joint transmission (CoMP JP/JT) transmission mode 46. The mode implementation unit 54 comprises scheduling coordination unit 56 and multi-point transmission coordination unit 58. The mode implementation unit 54 and scheduling coordination unit 56 serve to implement the respective transmission modes by initiating and governing the scheduling of transmissions to the wireless terminal, and thereby communicating and cooperating as necessary with base station nodes or control nodes of other cells, e.g., cells from which inter-cell downlink interference emanates. Communication links 60 reflect the signaling and other informational exchanges between transmission mode selector 40 and the base station nodes or control nodes of the other cells.

When node 28 is a base station node, e.g., either a radio base station node or an eNodeB, for example, the node 28 comprises communication interface 64 which facilitates radio transmissions with wireless terminal 30 over radio interface 32. When node 28 takes the form of a node other than a radio base station type node, the node 28 may connected ultimately through one or more other nodes, in which case it would be understood that communication interface 64 instead takes the form of an appropriate interface for connecting to the next node between node 28 and the wireless terminal 30.

In an example embodiment and as depicted by way of example in FIG. 2, the transmission mode selector 40, and indeed transmission controller 50, may be realized by a machine platform. To this end FIG. 2 employs a broken line to represent machine platform 80 which comprises transmission mode selector 40 and, in an example embodiment, transmission controller 50 as well. The terminology "machine platform" is a way of describing how the functional units of node 28 can be implemented or realized by machine. The machine platform 80 can take any of several forms, such as (for example) electronic circuitry in the form of a computer implementation platform or a hardware circuit platform. A computer implementation of the machine platform may be realized by or implemented as one or more computer processors or controllers as those terms are herein expansively defined, and which may execute instructions stored on non-transient computer-readable storage media. In such a computer implementation the machine platform 80 may comprise, in addition to a processor(s), a memory section (which in turn can comprise random access memory; read only memory; an application memory (a non-transitory computer readable medium which stores, e.g., coded non instructions which can be executed by the processor to perform acts described herein); and any other memory such as cache memory, for example). Another example platform suitable for transmission mode selector 40 is that of a hardware circuit, e.g., an application specific integrated circuit (ASIC) wherein circuit elements are structured and operated to perform the various acts described herein.

Figure 3:
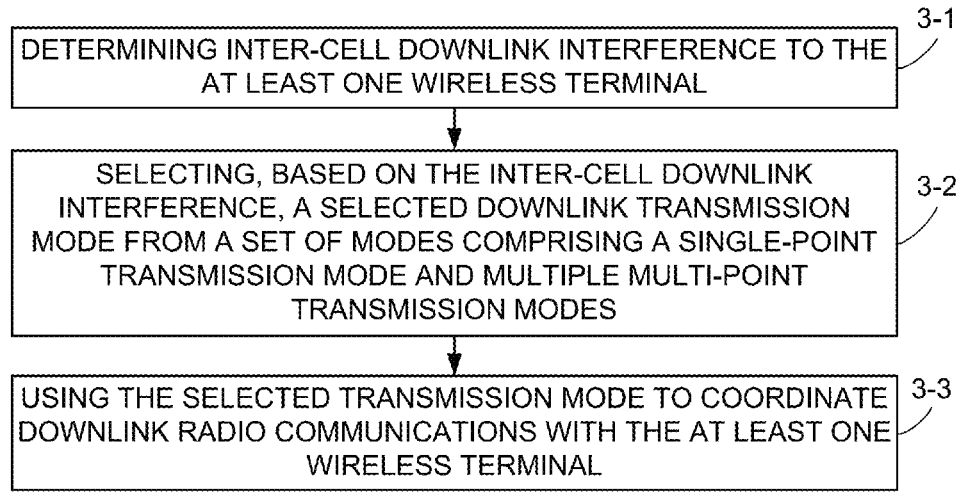
FIG. 3 is a flowchart depicting example acts or steps included in a basic, representative method of operating a radio communications network according to an example embodiment and mode.

FIG. 3 shows example acts or steps included in a basic, representative method of operating a radio communications network according to an example embodiment and mode. Act 3-1 comprises determining inter-cell downlink interference to the wireless terminal 30. Act 3-2 comprises selecting, based on the inter-cell downlink interference, a selected downlink transmission mode from a set of modes comprising a single-point transmission mode and multiple multi-point transmission modes. Act 3-3 comprises using the selected transmission mode to coordinate downlink radio communications with the wireless terminal 30.

In an example embodiment, the inter-cell downlink interference may be determined by the wireless terminal 30 and communicated by interference reporter 34 to node 28, e.g., to interference analysis unit 52. The selection of act 3-2 may be performed by transmission mode selector 40, and the implementation of act 3-3 may be performed by mode implementation unit 54.

Figure 4:
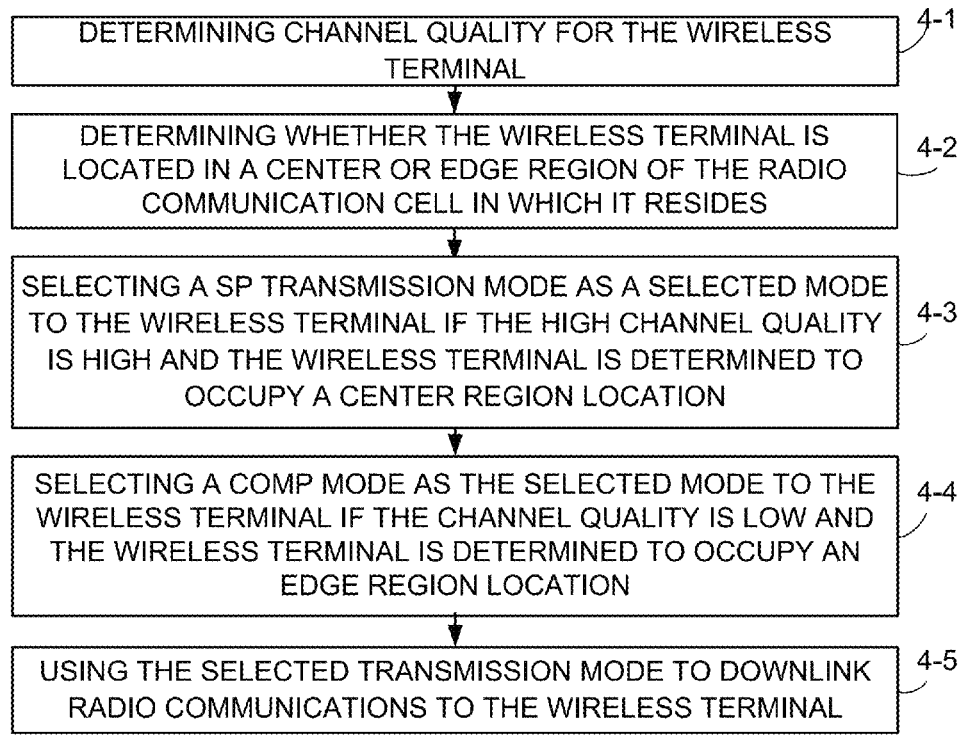
FIG. 4 is a flowchart depicting example acts or steps included in a basic, representative method of operating a radio communications network according to another example embodiment and mode.

FIG. 4 shows example acts or steps included in another basic, representative method of operating a radio communications network according to an example embodiment and mode. In the example embodiment and mode of FIG. 4 for convenience the inter-cell downlink interference is particularly expressed as channel quality, and accordingly the terms "inter-cell downlink interference" and "channel quality" may be used interchangeably. It should be appreciated that other measures or indicators of inter-cell downlink interference may alternatively be employed.

In the example method of FIG. 4, act 4-1 comprises determining channel quality for the wireless terminal 30. Act 4-2 comprises determining whether the wireless terminal 30 is located in a center or edge region of the radio communication cell in which it resides. Then either a selection according to act 4-3 or a selection according to act 4-4 is performed. Act 4-3 comprises selecting a single-point (SP) transmission mode as a selected mode for downlink radio communications to the wireless terminal if the high channel quality is high and the wireless terminal is determined to occupy a center region location. Act 4-4 comprises selecting a coordinated multi-point transmission mode (CoMP) as the selected mode for downlink radio communications to the wireless terminal if the channel quality is low and the wireless terminal is determined to occupy an edge region location. Act 4-5 comprises using the selected transmission mode to downlink radio communications to the wireless terminal.

Thus, as understood with reference, e.g., to FIG. 4, in an example embodiment and mode the method further comprises determining a region location of the wireless terminal relative to a center of a cell which serves the wireless terminal. In an example implementation, the method further comprises selecting the single point transmission mode for a wireless terminal located in the center region of the cell and having channel quality in a high channel quality range (H); and, selecting one of the multi-point transmission modes based on a low channel quality for a wireless terminal located in an edge region of the cell and having channel quality below the high channel quality range (H). In an example implementation, the method further comprises selecting a coordinated scheduling/coordinated beam-forming (CoMP CS/CB) transmission mode based on a low channel quality for a wireless terminal located in the edge region of a radio communication cell and having channel quality in a low channel quality range (L1), wherein L1<H; and selecting a joint processing/joint (CoMP JP/JT) transmission mode for a wireless terminal located in an edge region of the cell and having channel quality in a lowest channel quality range (L2), wherein L2<L1.

Coordinated multi-point transmission (CoMP) serves as at least one the multi-point transmission modes for example embodiments and modes of the methods of FIG. 3 and FIG. 4 or modes otherwise encompassed hereby. For example, and as understood with reference to FIG. 1, the multiple multi-point transmission modes may include any of coordinated scheduling/coordinated beam-forming (CoMP CS/CB) transmission mode 44 and coordinated joint processing/joint transmission (CoMP JP/JT) transmission mode 46.

In an example embodiment and mode the act of determining the inter-cell interference (e.g., the channel quality) comprises performing at least one radio signal measurement. The at least one radio signal measurement may be preformed by a signal measurement unit of wireless terminal 30, which may include the interference reporter 34 illustrated, e.g., in FIG. 1. In an example implementation, the at least one radio signal measurement includes a signal to interference plus noise ratio (SINR) as detected or determined by the signal measurement unit.

FIG. 5 shows a network diagram and illustrates cells of radio communications network 20 which illustrate inter-cell interference for wireless terminals. As shown, nodes 101, 102, and 103, serve cells 104, 105, and 106 respectively. Located within each respective cell's coverage are one or more wireless terminals, e.g., UEs 107, 108, 109, 110, etc. Wireless terminals are defined as communication devices which may be termed user equipment (UEs), handheld terminals, mobile devices, mobile telephones, cell phones, smart phones, or equivalent devices known or future which are served by a telecommunications node. In addition, the wireless terminal may be fixed or mobile. In some instances, the wireless terminals are located near a center region 111 of each cell, and others located outside the center in an edge 112 of the cell. Of specific interest are wireless terminals similar to UE 108, where more than one node can serve the wireless terminal while it is located near the edge of all three cell coverage areas 104, 105, and 106. Transmission beams 113, 114, and 115 all provide downlink (DL) signals to the UE 108 and therefore may provide inter-cell interference.

Figure 6:
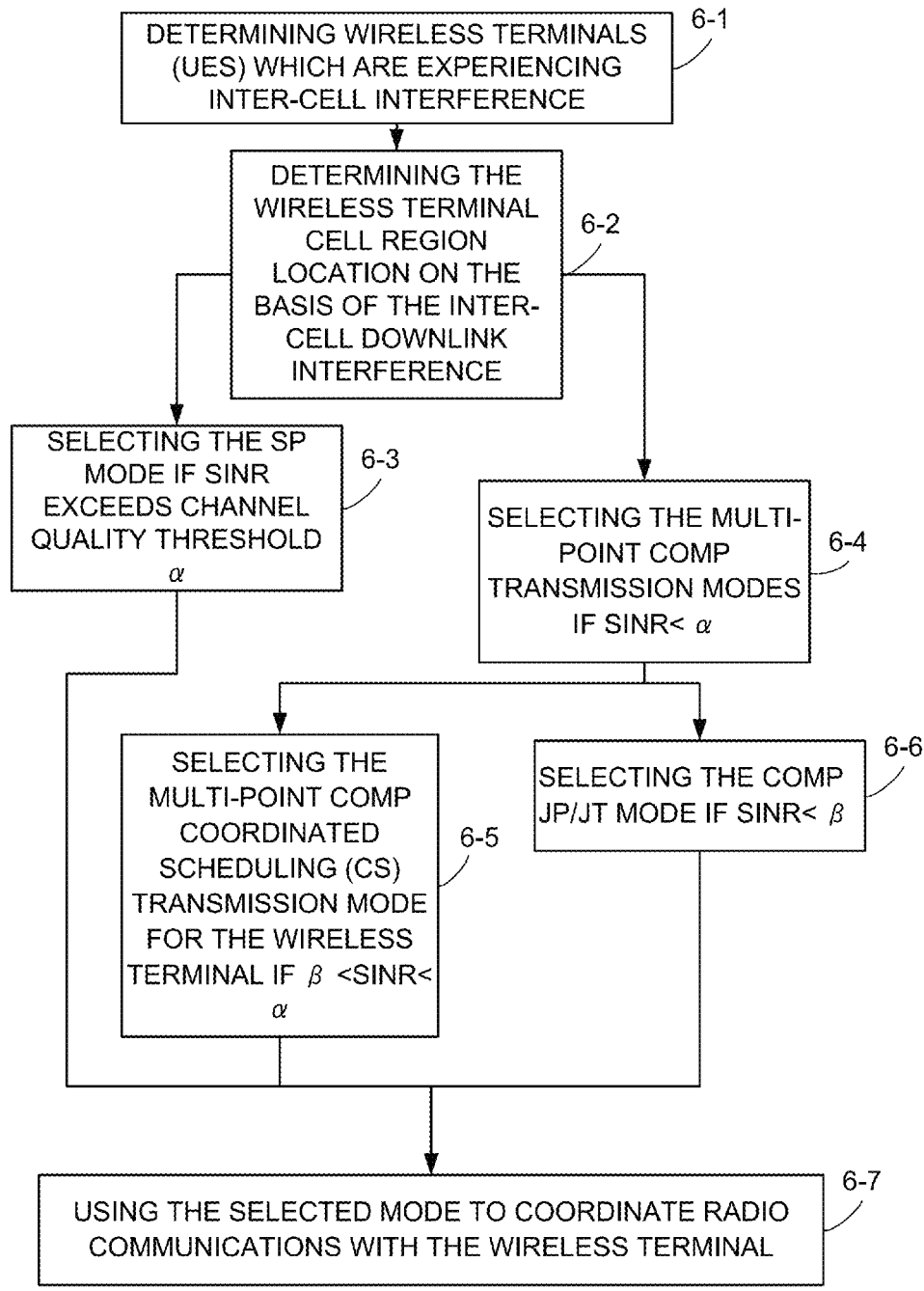
FIG. 6 is a flowchart depicting example acts or steps included in a basic, representative interference level-based CoMP mode selection scheme.

FIG. 6, illustrates a non-limiting embodiment and mode of a method of operation a communication system according to the technology disclosed herein, and particularly a method which determines which wireless terminals should be under CoMP transmission, e.g., receive CoMP transmissions on the downlink. Act 6-1 comprises determining wireless terminals (UEs) which are experiencing inter-cell interference. In an example implementation, the signal to interference plus noise ratio (SINR) may be used as a measure or representation to determine or detect channel quality, and thus a measure or indicator of downlink (DL) inter-cell interference. Act 6-2 comprises determining the wireless terminal cell region location on the basis of the inter-cell downlink (DL) interference. For example, the cell region location may be either center cell or cell edge. Concerning act 6-2, a higher channel quality indicates a center region location and lower channel quality indicates a cell edge region.

Act 6-3 comprises selecting the SP transmission mode if the signal to interference plus noise ratio is good (e.g., when the wireless terminal has high channel quality) according to SINR>α, where α is defined as a channel quality threshold. In this scenario, the wireless terminal is defined as a "center of cell" user experiencing less interference by a neighboring cell. For this center of cell user, all interference can be neglected, and even if other cells wanted to co-operate, they would only marginally assist.

Act 6-4 comprises selecting the multi-point CoMP transmission modes, as opposed to the SP transmission mode, if for the wireless terminal SINR<α, where α is the aforementioned channel quality threshold. In this scenario, the wireless terminal is defined as a "cell edge" user experiencing more interference (e.g., low channel quality) by/from a neighboring cell. In traditional interference processing techniques, this wireless terminal would be scheduled to avoid the interference. But in this example one of the multi-point CoMP transmission modes will instead be employed as represented by act 6-4, with the result that the non-trivial interference effect from other cells may provide an opportunity to improve the receptivity of the downlink (DL) transmission by this wireless terminal.

Either the multi-point CoMP Coordinated Scheduling (CS) transmission mode, represented by act 6-5, or the multi-point CoMP Joint Processing (JP) transmission mode, represented by act 6-6, may be the particular one of the CoMP transmission modes upon CoMP transmission which is selected at act 6-4 over SP transmission.

Thus, in an example implementation, a first level of selection may comprise selection between SP transmission mode (represented by act 6-3) and the multi-point CoMP transmission modes (represented by act 6-4); and a second level of selection may comprise selection between the multi-point CoMP Coordinated Scheduling (CS) transmission mode and the multi-point CoMP Joint Processing (JP) transmission mode (represented by act 6-5 and 6-6, respectively).

In particular, act 6-5 comprises selecting the multi-point CoMP Coordinated Scheduling (CS) transmission mode for the wireless terminal if for this wireless terminal β<SINR<α, where β is defined as a second channel quality threshold. In this scenario, the wireless terminal is defined as a cell edge user experiencing strong interference (i.e., low channel quality) by a neighboring cell. The channel quality of cell-edge user is worse, and thus the transmission priority for this UE is higher than it would be if the wireless terminal operated in the SP transmission mode. Thus, in this scenario, the multi-point CoMP Coordinated Scheduling (CS) transmission mode is selected when there is little space to help other users.

Act 6-6 comprises selecting the CoMP JP/JT mode for this wireless terminal if, for this wireless terminal, the SINR<β. In this scenario, the wireless terminal is defined as a cell edge user experiencing very strong interference (i.e., very low channel quality) by a neighboring cell. The channel quality of cell-edge user is worst, and since the channel quality is the worst the transmission priority is the highest.

Once a mode is selected, act 6-7 comprises using the selected mode to coordinate radio communications with the wireless terminal.

When selecting between modes, the relative priority levels of the modes are taken into consideration. The priority levels are associated with channel quality, and the channel quality is classified in accordance with three classification levels: high, "worse", and as "the worst". The CoMP JP/JT transmission mode scenario 46 is considered for a cell-edge wireless terminal with the worst channel quality and is designated as priority S1. The CoMP CS/CB mode scenario 44 is considered for cell-edge wireless terminal with the worse channel quality and is designated as priority S2. A wireless terminal in the center of the cell has the best channel quality designated as priority S3. When considering mode selection, first or highest priority goes to wireless terminals experiencing the worst channel quality; wireless terminals experiencing worse channel quality are given second priority; and wireless terminals experiencing the best channel quality are given third or last priority. Thus, the Comp transmission priority is highest to lowest as follows: 1) a wireless terminal in a cell-edge region of the worst channel quality; 2) wireless terminal in a cell-edge region of the worse channel quality; and 3) a wireless terminal in center of cell of the best channel quality.

The number of users, e.g., number of wireless terminals or UEs that may be supported by the CoMP modes is defined as $N_b*N_t/N_{rt}$. The number of users that may be supported by the CoMP JP mode is defined as $N_t/N_{rt}$. As used herein, $N_t$ represents the number of transmitting antennas involved in the nodes/cells participating in the CoMP downlink transmission; $N_{rt}$ represents the number of UE antennas involved in CoMP for each UE; and $N_b$ represents base station nodes in CoMP (e.g., NodeBs, eNodeB s).

Figure 7:
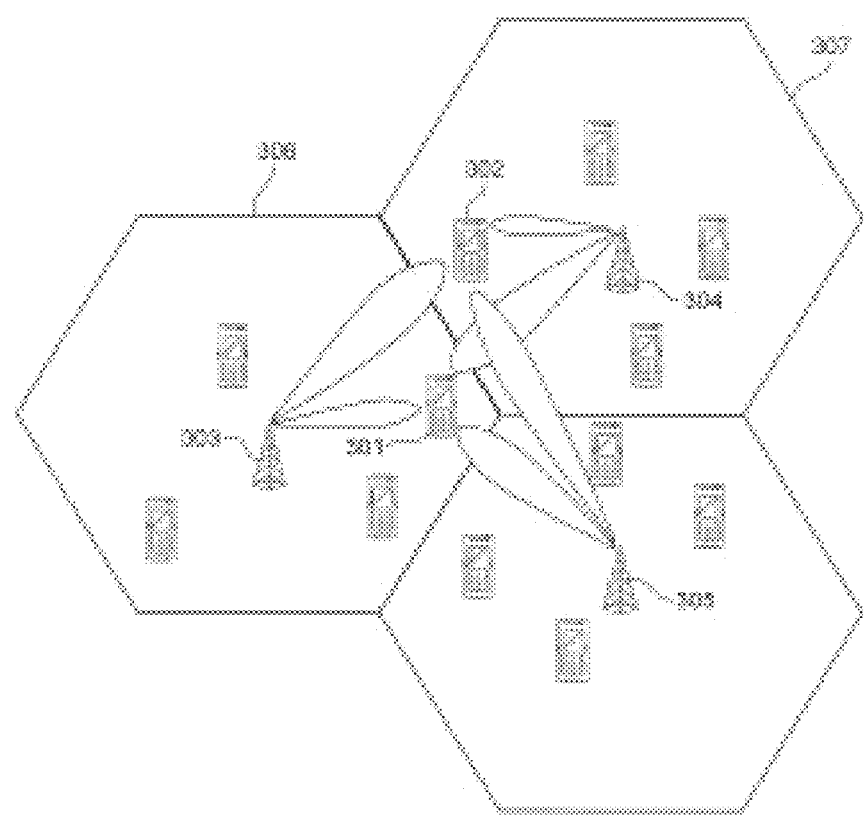
FIG. 7 is a diagrammatic view of a non-limiting CoMP JP implementation scheme.

FIG. 7 illustrates a non-limiting CoMP JP implementation diagram. In the scenario shown in FIG. 7, UE 301, served by node 303 and in an edge of cell coverage 306, experiences downlink (DL) interference from nodes 304 and 305. UE 302, served by node 304 and in an edge of cell coverage 307, experiences downlink (DL) interference from nodes 303 and 305. In this condition in which $S1>N_t/N_{rt}$, both UEs 301 and 302 with the worst channel quality and highest priority are supported by the CoMP JP/JT transmission mode. As shown, each of three cooperation base stations 303, 304, and 305 radiates, e.g., two beamforming transmissions, one to each of UE 301 and UE 302, which thereby obtain the diversity gain.

Figure 8:
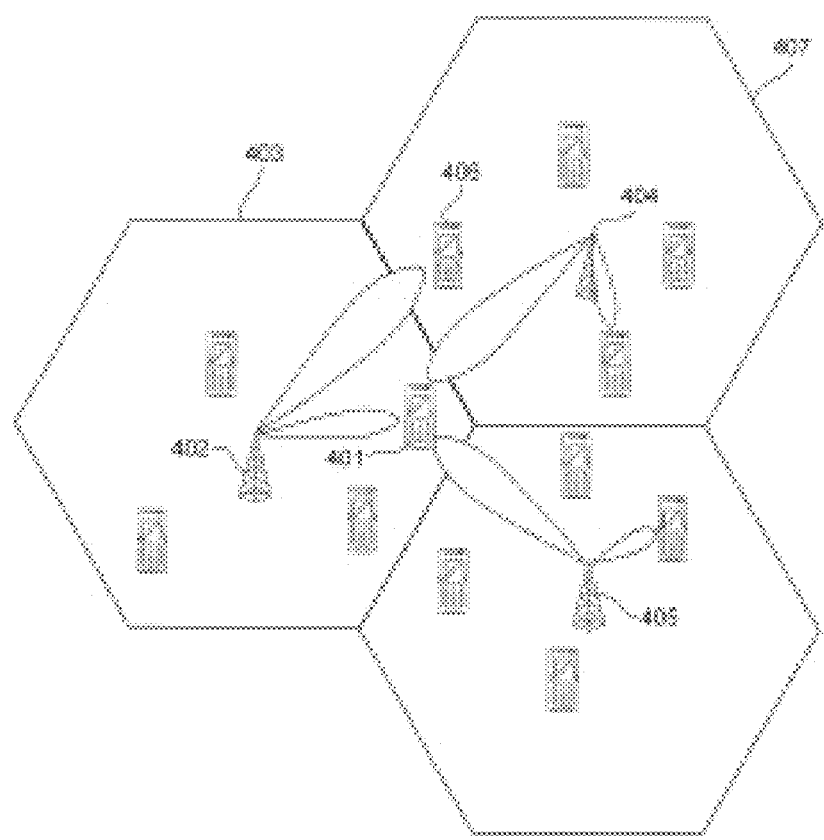
FIG. 8 is a diagrammatic view of a non-limiting CoMP JP and CS implementation scheme.

FIG. 8 illustrates a non-limiting CoMP JP and CS implementation diagram. As shown in FIG. 8, UE 401, served by node 402 and in an edge of cell coverage 403, experiences downlink (DL) interference from nodes 404 and 405. In addition UE 406, within the edge of cell coverage 407, receives downlink (DL) transmissions from node 402. For UE 401 with the worst channel quality, CoMP JP/JT is used to obtain diversity gain. UE 406, with condition $0<S1<N_t/N_{rt}$, (worse channel quality), is supported by CoMP CS/CB transmission mode and is used to service the cell-edge user and improve the cell capacity. Worst channel quality users (e.g., UE 401) is preferentially selected (S1), then remaining worse channel quality users (Nb*(Nt/Nrt−S1)) are selected from priority S2. Nodes 402, 404, and 405 (e.g., base stations) in CoMP construct and with beamforming coordinate transmission of shared data to each of the UEs. For example, as shown, cooperating nodes 402, 404, and 405 (e.g., base stations) in CoMP transmit the shared data to the UE 401 of worst channel quality to obtain the diversity gain. In addition, each of cooperating nodes 402, 404, and 405 (e.g., base stations) transmits data to UE 406 of worse channel quality separately. Therefore, CoMP dynamically schedules and coordinates to reduce inter-cell interference.

Figure 9:
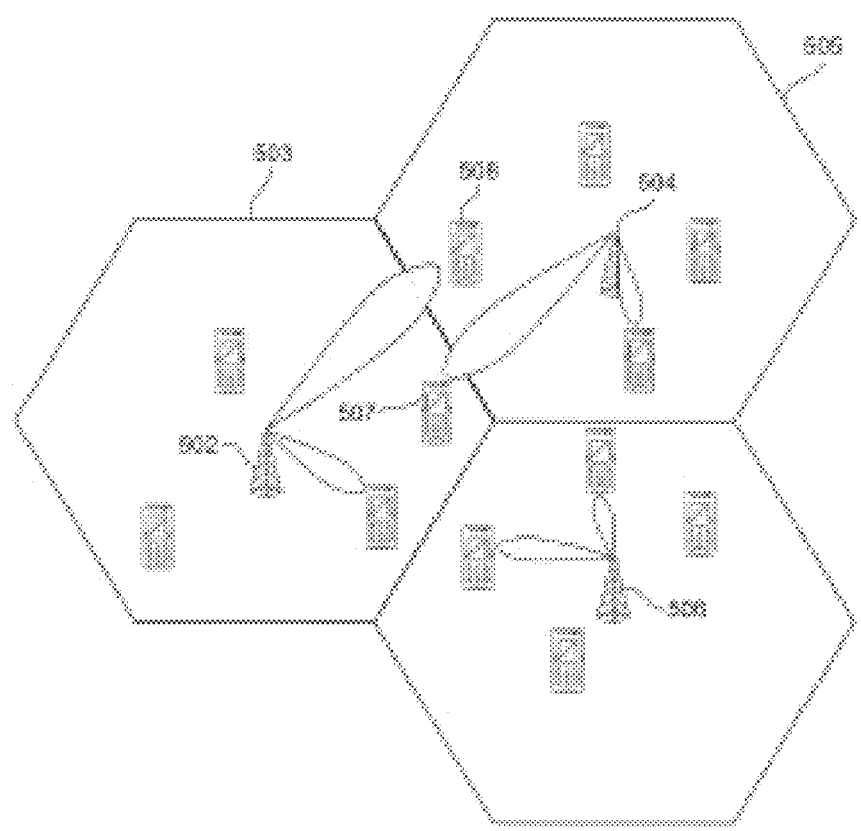
FIG. 9 is a diagrammatic view of a non-limiting CoMP CS implementation scheme.

FIG. 9 illustrates a non-limiting CoMP CS implementation diagram. As shown in FIG. 9, UE 507, in an edge of cell coverage 503, experiences downlink (DL) interference from nodes 504 and 506. In addition UE 508, within the edge of cell coverage 505, receives DL transmissions from node 502. In this example, the number of UEs with the worst channel quality is zero (S1=0), and therefore CoMP CS is used to obtain multiplexing gain for UEs of the worse channel quality (e.g., UE 507 and UE 508). CoMP CS transmission may support Nb*Nt/Nrt users. Nodes 402, 404, and 405 (e.g., base stations) in CoMP construct and with beamforming coordinate transmission of shared data to each of the UEs by choosing a beam matrix to eliminate the interference.

In a more detailed non-limiting aspect, the interference level based CoMP mode selection includes UE feedback of respective channel matrixes to a base station in a recognized time slot.

This technology described herein includes a cell edge user central based CoMP CS JP mode selection scheme. After guaranteeing the performance of cell edge user at first, mode selection is preferably applied to select suitable paired users in order to increase the cell average throughput. Through carefully designing the signal to interference plus noise ratio (SINR) gaps and level of interference for mode selection, mode selection is a significant solution for the tradeoff between cell edge user throughput and cell average throughput and the tradeoff between performance and complexity.

Compared with CoMP CS, the mode selection techniques described herein may achieve higher average sector throughput. For a particular cell edge user, although the performance of mode selection may decrease because other users shares the same time frequency resource, the QoS of the user may not be significantly affected through the calculation of the level of interference.

Compared with CoMP JP, although the sector average throughput may decrease, the performance of cell edge users may be better guaranteed. In addition, mode selection as described herein may provide higher flexibility and lower capacity requirement of the backhaul link.

Through designing interference levels, CoMP CS JP can be a special case of mode selection. Interference-based CoMP CS JP mode selection provides higher flexibility for systems and is a significant solution to increase cell edge user throughput and increase the cell average throughput.

Although the description above contains many specificities, these should not be construed as limiting the scope of the technology disclosed herein but as merely providing illustrations of some of the presently preferred embodiments of the technology disclosed herein. Thus the scope of the technology disclosed herein should be determined by the appended claims and their legal equivalents. Therefore, it will be appreciated that the scope of the technology disclosed herein fully encompasses other embodiments which may become obvious to those skilled in the art, and that the scope of the technology disclosed herein is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the technology disclosed herein, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A method in a radio communications network, the radio communications network including a plurality of radio communication cells and at least one wireless terminal served by one or more of the plurality of radio communication cells, the method comprising:
   determining inter-cell downlink interference to the at least one wireless terminal;
   selecting, based on the inter-cell downlink interference, a selected downlink transmission mode from a set of modes comprising a single-point transmission mode and a plurality of multi-point transmission modes, wherein the single-point transmission mode is selected if the at least one wireless terminal is located in a center region of a radio communication cell and has a channel quality in a high quality range (H) and one of the plurality of the multi-point transmissions modes is selected if the at least one wireless terminal is located in an edge region of the radio communication cell and has a channel quality below the high quality range (H);
   using the selected downlink transmission mode to coordinate downlink radio communications with the at least one wireless terminal; and
   selecting a coordinated scheduling/coordinated beamforming (CoMP CS/CB) transmission mode based on a low channel quality for the at least one wireless terminal located in the edge region of the radio communication cell and having channel quality in a low channel quality range (L1), wherein L1<H.

2. The method of claim 1, wherein at least one of the plurality of the multi-point transmission modes comprises coordinated multi-point transmission (CoMP).

3. The method of claim 2, wherein the plurality of multi-point transmission modes includes any of: a coordinated scheduling/coordinated beam-forming (CoMP CS/CB) transmission mode and a coordinated joint processing/joint transmission (CoMP JP/JT) transmission mode.

4. The method of claim 1, wherein determining the inter-cell interference comprises performing at least one radio signal measurement.

5. The method of claim 4, wherein the at least one radio signal measurement includes signal to interference plus noise ratio (SINR).

6. he method of claim 1, further comprising determining a region location of the at least one wireless terminal relative to a center of a cell which serves the wireless terminal.

7. The method of claim 1, further comprising selecting a joint processing/joint (CoMP JP/JT) transmission mode for a wireless terminal located in an edge region of the cell and having channel quality in a lowest channel quality range (L2), wherein L2<L1.

8. A method in a radio communications network, the radio communications network including a plurality of radio communication cells and at least one wireless terminal served by one or more of the plurality of radio communication cells, the method comprising:
- determining channel quality for the at least one wireless terminal;
- determining whether the at least one wireless terminal is located in a center or edge region of a radio communication cell in which the at least one wireless terminal resides;
- selecting a single-point (SP) transmission mode as a selected transmission mode for downlink radio communications to the at least one wireless terminal if the channel quality is high and the at least one wireless terminal is determined to occupy the center region location of the radio communication cell;
- selecting a coordinated multi-point (CoMP) coordinated scheduling/coordinated beam-forming (CS/CB) transmission mode or a CoMP Joint Processing/Joint Transmission (JP/JT) transmission mode as the selected transmission mode for downlink radio communications to the at least one wireless terminal if the channel quality is low and the at least one wireless terminal is determined to occupy an edge region location of the radio communication cell;
- selecting the CoMP coordinated scheduling/coordinated beam-forming (CoMP CS/CB) transmission mode based on a low channel quality for when the at least one wireless terminal is located in the edge region of the radio communication cell and has channel quality in a low channel quality range (L1); and
- selecting the CoMP joint processing/joint transmission (CoMP JP/JT) transmission mode when the at least one wireless terminal is located in the edge region of the radio communication cell and has channel quality in a lowest channel quality range (L2), wherein L2<L1; and
- using the selected transmission mode to downlink radio communications to the at least one wireless terminal.

9. The method of claim 8, selecting between plural types of CoMP transmission modes based on a relative channel quality at the edge region of the cell.

10. A node of a radio communications network comprising:
- electronic circuitry configured to select, based on inter-cell downlink interference to at least one wireless terminal of the network, a selected downlink transmission mode from a set of modes comprising a single-point transmission mode and a plurality of multi-point transmission modes, wherein the single-point transmission mode is selected if the at least one wireless terminal is located in a center region of a radio communication cell and has a channel quality in a high quality range (H) and one of the plurality of the multi-point transmissions modes is selected if the at least one wireless terminal is located in an edge region of the radio communication cell and has a channel quality below the high quality range (H);
- wherein the electronic circuitry is further configured to select a coordinated scheduling/coordinated beam-forming (CoMP CS/CB) transmission mode based on a low channel quality for the at least one wireless terminal located in the edge region of the radio communication cell having channel quality in a low channel quality range (L1), wherein L1<H.

11. The node of claim 10, wherein the electronic circuitry is further configured to use the selected downlink transmission mode to coordinate downlink radio communications with the at least one wireless terminal.

12. The node of claim 10, wherein at least one of the plurality of the multi-point transmission modes comprises coordinated multi-point transmission (CoMP).

13. The node of claim 12, wherein the plurality of multi-point transmission modes includes any of: a coordinated scheduling/coordinated beam-forming (CoMP CS/CB) transmission mode and a coordinated joint processing/joint transmission (CoMP JP/JT) transmission mode.

14. The node of claim 10, wherein the inter-cell interference is expressed as at least one radio signal measurement.

15. The node of claim 14, wherein the at least one radio signal measurement is expressed as a signal to interference plus noise ratio (SINR).

16. The node of claim 10, wherein the electronic circuitry is further configured to determine a region location of the at least one wireless terminal relative to a center of a cell which serves the wireless terminal.

17. The node of claim 10, wherein the electronic circuitry is further configured to select a joint processing/joint (CoMP JP/JT) transmission mode for a wireless terminal located in an edge region of the cell and having channel quality in a lowest channel quality range (L2), wherein L2<L1.

18. A radio communications network comprising:
- a plurality of radio communication cells;
- a node;
- at least one wireless terminal served by one or more of the plurality of radio communication cells, the wireless terminal configured to provide an indication of inter-cell downlink interference for the at least one wireless terminal to the node;
- wherein the node comprises processing circuitry configured to select, based on inter-cell downlink interference to at least one wireless terminal of the network, a selected downlink transmission mode from a set of modes comprising a single-point transmission mode and a plurality of multi-point transmission modes, wherein the single-point transmission mode is selected if the at least one wireless terminal is located in a center region of a radio communication cell and has a channel quality in a high quality range (H) and one of the plurality of the multi-point transmissions modes is selected if the at least one wireless terminal is located in an edge region of the radio communication cell and has a channel quality below the high quality range (H);
- wherein the electronic circuitry is further configured to select a coordinated scheduling/coordinated beam-forming (CoMP CS/CB) transmission mode based on a low channel quality for the at least one wireless terminal located in the edge region of the radio communication cell and having channel quality in a low channel quality range (L1), wherein L1<H.

19. The network of claim 18, wherein the electronic circuitry is further configured to use the selected downlink transmission mode to coordinate downlink radio communications with the at least one wireless terminal.

20. The network of claim 18, wherein at least one of the plurality of the multi-point transmission modes comprises coordinated multi-point transmission (CoMP), and wherein the multiple multi-point transmission modes include any of: a coordinated scheduling/coordinated beam-forming (CoMP CS/CB) transmission mode and a coordinated joint processing/joint transmission (CoMP JP/JT) transmission mode.

* * * * *

UNITED STATES PATENT AND TRADEMARK OFFICE
CERTIFICATE OF CORRECTION

| | | |
|---|---|---|
| PATENT NO. | : 9,130,709 B2 | Page 1 of 1 |
| APPLICATION NO. | : 13/612047 | |
| DATED | : September 8, 2015 | |
| INVENTOR(S) | : Hu et al. | |

It is certified that error appears in the above-identified patent and that said Letters Patent is hereby corrected as shown below:

In the specification

In Column 7, Lines 12-13, delete "network comprising network" and insert -- network. --, therefor.

In Column 13, Line 4, delete "(Nb*(Nt/Nrt-S1))" and insert -- $(N_b*(N_t/N_{rt}-S1))$ --, therefor.

In Column 13, Line 24, delete "Nb*Nt/Nrt" and insert -- $N_b*N_t/N_{rt}$ --, therefor.

In Column 14, Line 63, in Claim 6, delete "he method" and insert -- The method --, therefor.

Signed and Sealed this
Fifteenth Day of March, 2016

Michelle K. Lee
*Director of the United States Patent and Trademark Office*